Nov. 26, 1957 P. F. BRINEN 2,814,467
UNIT-HEATER MOTOR MOUNTING
Filed June 16, 1954 2 Sheets-Sheet 1

INVENTOR:
Paul P. Brinen,
BY
ATTORNEY.

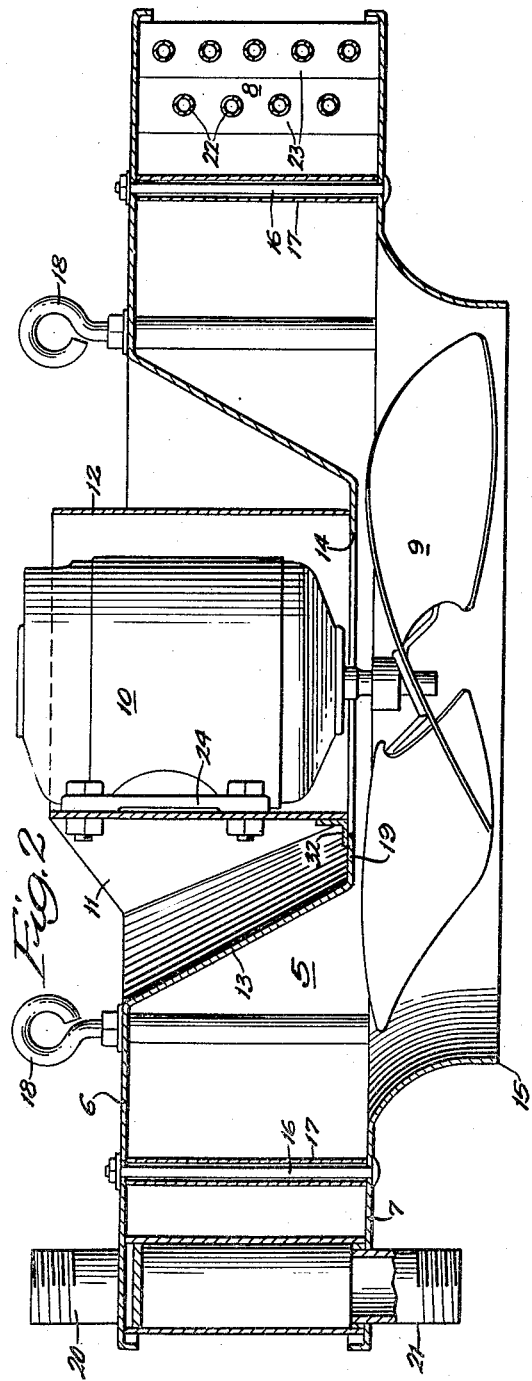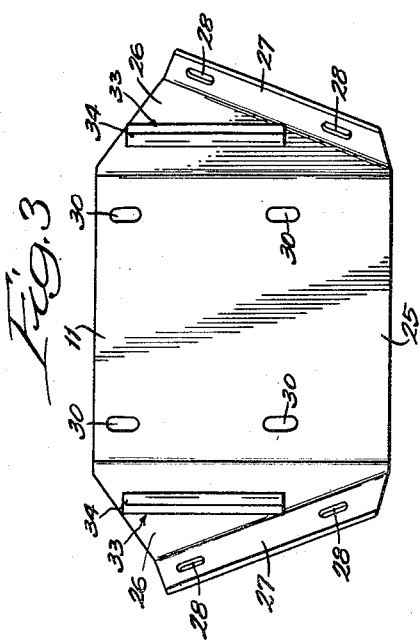

United States Patent Office 2,814,467
Patented Nov. 26, 1957

2,814,467

UNIT-HEATER MOTOR MOUNTING

Paul F. Brinen, Racine, Wis., assignor to Young Radiator Company, Racine, Wis., a corporation of Wisconsin Application June 16, 1954, Serial No. 437,254

3 Claims. (Cl. 257—1)

This invention relates to motor-mountings for unit heaters, and particularly with heaters of the vertical or overhead type, such as shown in Patent No. 2,504,798.

As is so fully explained in that patent, one of the major difficulties confronting the producers and users of that type of unit is the mounting of the fan motor so as to afford the greatest possible protection against the deteriorating effects of the heat radiated by the surrounding heating coil. In the construction shown in this patent, a cylindrical stack is provided wherein to so mount and partially enclose the motor as to insure at all times a dissipation of heat from around the motor by reason of the axial circulation of air through this motor-embracing stack. However, the motor-stack mounting, illustrated in that patent, has presented the problem of having to have the motors therefor specially constructed for the producer of the unit in order to make possible the motor being mountable within the limitations of the stack. Such specially-made motors have been required for the reason that practically all the commercially-available motors have their conduit boxes so located on the motor housing as to make it impractical, if not impossible, to arrange such motors within the stack formed as shown in that patent.

The main objects of this invention, therefore, are to provide an improved form of motor-mounting for unit heaters, particularly of the vertical or overhead type; to provide an improved motor-mounting for unit heaters of this kind which will accommodate practically any commercially-available motor; to provide an improved motor-mounting for unit heaters of this kind wherein the motor-enclosing stack is positionable around the motor after the motor is secured in place on the mounting and is removable before the motor has to be demounted; and to provide an improved motor-mounting with removable stack of this kind which is so simple in construction as to make its production very economical and the mounting and demounting of the motor and stack comparatively facile.

In the accompanying drawings:

Fig. 2 is a horizontal sectional view through the center of the same; and

Fig. 3 is an elevational view of the bracket forming a part of this improved motor mounting, the view being taken on the plane of the line 3—3 of Fig. 1.

Figure 1:
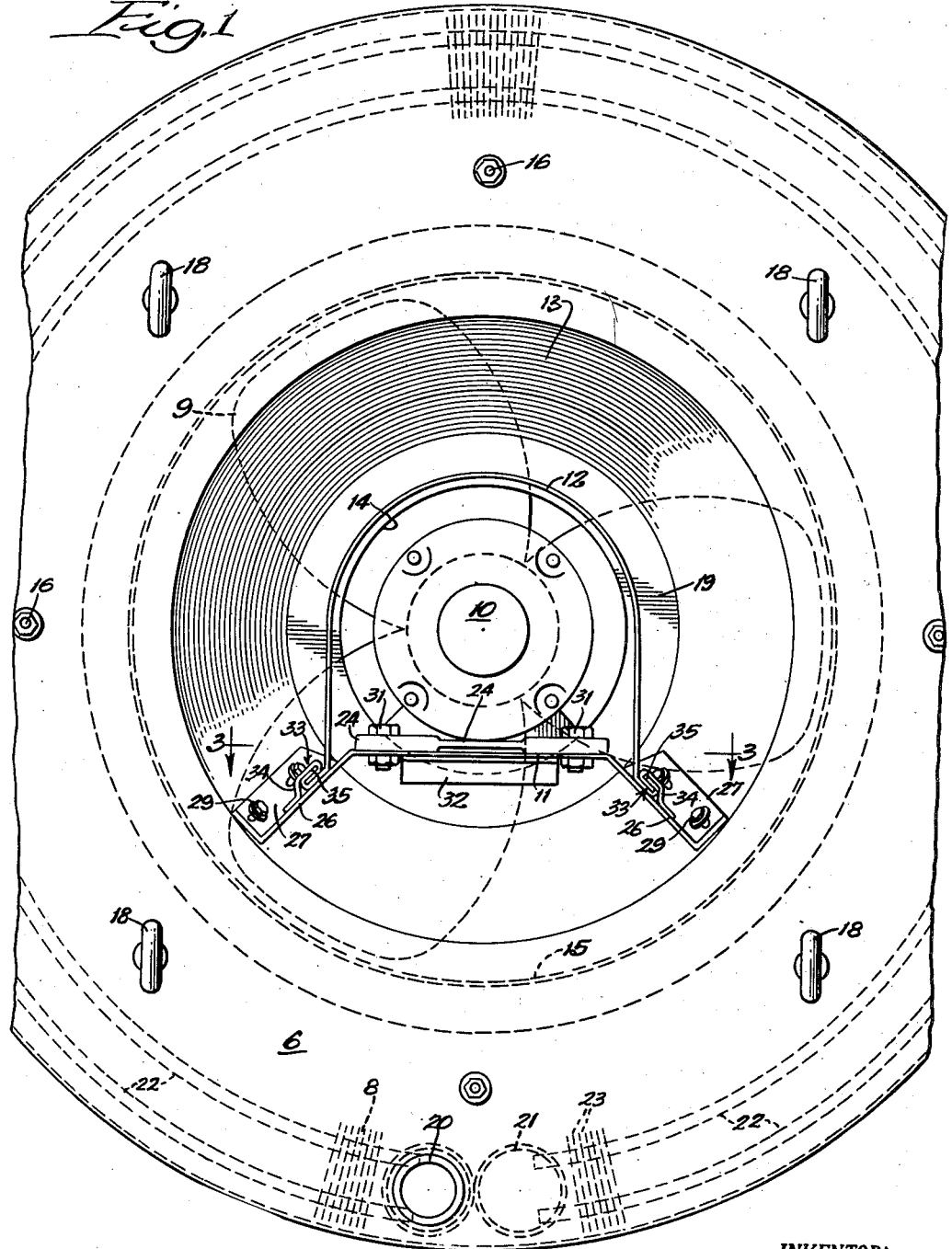
Fig. 1 is a plan view, partly broken away, of a unit heater such as shown in the aforesaid patent and equipped with a motor mounting constructed in accordance with this invention.

The essential concept of this invention involves a housing plate formed with an axially open frusto-conical section whereto is bonded a bracket disposed on a chord of the section opening for supporting the motor substantially concentrically of the section opening, the motor being enclosed in a stack removably positionable on the bracket.

A vertical type unit-heater, with a motor-mounting embodying the foregoing concept, comprises a housing 5 formed of spaced plates 6 and 7 between which is supported a heating coil 8 through and around which air is drawn and directed downwardly by a fan 9 driven by a motor 10 mounted on a bracket 11 and enclosed within a stack 12.

The upper housing plate 6 is a disk-like stamping with the central part offset to form a frusto-conical wall section 13 terminating in a radially-disposed flange 19 bounding an axial opening 14, spaced from the plane of the plate 6 a distance almost equal to the spacing between the plates 6 and 7 (see Fig. 2).

The lower plate 7, also a disk-like stamping, is formed with an axial offset to constitute the shroud 15 for the fan 9.

The two plates are rigidly secured in predetermined spaced relation by a series of bolts and nuts 16 and embracing spacers 17. Certain of these bolts 16 are formed with ring-heads 18 whereby the unit is suspended from the ceiling.

The heating coil 8 is a conventional structure comprising a pair of headers 20 and 21 connected by a series of tubes 22 on which are arranged the conventional heat-dissipating fins 23.

The fan 9 may be of any suitable construction. Its diameter is slightly less than the internal diameter of the shroud 15. Preferably the fan is so positioned in the heater housing that the plane of the lower edges of the blades is very close to the plane of the perimeter of the open end of the shroud 15.

The motor 10 may be any commercially-available make, preferably of the "fan-on-shaft-air-over" type. Obviously, the motor must have a platform 24 by which it may be secured in place.

The motor mounting constructed in accordance with this invention, for securing the motor 10 and its fan 9 in operative relationship to the unit-heater housing 5, comprises the frusto-conical wall section 13 of the upper housing plate 6, the bracket 11, and the stack 12. The bracket 11 and the stack 12 are provided with telescoping means 33 whereby the stack is removably positionable around the motor 10 after it has been mounted.

The bracket 11 is herein shown in the form of a stamping with a base 25 along the lateral edges of which are the integral wings 26, the outer perimetrical portions of which wings are turned to form flanges 27.

The base 25 is of rectangular form with the wings 26 practically triangular in shape and are divergently disposed with respect to the base 25 at angles of about 45 degrees (see Fig. 1). The flanges 27 are disposed at right angles to the wings 26, as will be most evident from Fig. 1.

The triangular form of the wings 26 is such that with the flanges 27 set flat against the inner face of the frusto-conical wall section 13, at circumferentially-spaced points, the bracket base 25 is axially disposed within the frusto-conical wall section 13 on a chord of the opening 14 (see Fig. 1).

Appropriately elongated and alined slots 28 are formed in the flanges 27 whereby suitable bolts or machine screws 29 may be employed to bond the bracket 11 in place on the wall section 13, in the position above noted. Other bonding means than bolts or screws could be used, as for example, brazing or soldering.

Likewise, appropriately elongated and spaced slots 30 are formed in the base 25 for the insertion of bolts 21 for anchoring the motor 10 to the bracket 11 with the motor axis substantially concentric with the opening 14, thus locating the fan 9 concentrically in the shroud 15.

To enhance the rigidity of the bracket 11 on the wall section 13, and to preclude air flow rearwardly of the motor an angle plate 32 may be arranged, as shown in Fig. 2, and bolted, brazed, or soldered to or even made integral with the bracket base 25 and suitably secured to the flange 19.

The stack is here shown of arcuate form and of height to extend from the wall-section flange 19 a short distance above the housing plate 6. This is approximately the axial dimension of any motor likely to be used with this unit heater.

The telescoping means 33, for removably positioning the stack 12 in place around the motor 10 comprises interfitting C-shaped flange elements respectively secured to the bracket 11 and integrally formed on the stack 12. For the bracket 11, these elements are in the form of strips 34 brazed or welded to the wings 26 so as to extend axially of the bracket when it is in place on the wall section 13. The overlapping flange that forms the C is spaced from the face of the respective wings 26. The stack 12 has the ends thereof doubled back to form parallel flanges 35 and which are so angularly disposed as to telescope with the C-part of the respective strips 34.

A motor mounting of this kind has all the advantages of effective heat dissipation from around the motor 10 that is claimed for the construction shown in the aforesaid Patent No. 2,540,798. However, the form and positioning of the bracket 11 and the removable stack 12 make it possible to use practically any commercially-available motor, which is not possible with the construction of this patent.

With the bracket 11 secured in place on the wall section 13 of the housing plate 6, and the stack 12 removed, ample space is available to permit easy positioning of the motor and securing it to the bracket 11; this regardless of where the conduit box may be placed on the motor. Once the motor 10 is secured in place and connected to the source of power, the stack 12 is easily set in place by locating the C elements in position to telescope with each other so that the stack can slide down into position, with its bottom perimeter resting on the flange 19. The stack provides for the desired air flow in either direction—depending upon whether the motor is operating or idle—as explained in the aforesaid patent. When it is desired to have full access to the motor 10, for repairs or replacement, the stack 14 is quickly removed and a workman has practically unobstructed access to the motor 10 and its mounting bracket.

Variations and modifications in the details of the structure and arrangement of the parts may be resorted to within the spirit and coverage of the appended claims.

I claim:

1. A unit-heater motor-mounting comprising, a unit-heater housing-plate having a central-inclined wall section bounding an axial opening spaced inwardly of the plate, a bracket having a rectangular base with integral divergently-extending wings along the lateral edges of the base, means on the wings bonded to the wall section to dispose the bracket base axially of the plate on a chord of the opening, an arcuate-shaped motor-enclosing element, and coacting interlocking means on the bracket and the element for removably positioning the element around the motor secured to the bracket base to form an air-flow channel around the motor.

2. A unit-heater motor-mounting comprising, a unit-heater housing-plate with an inwardly-extending axially-open frusto-conical wall section, a bracket having a rectangular base with integral divergently-extending substantially triangular-shaped wings along the lateral edges of the base which wings terminate in integral flanges along their outer edges bonded to the inner face of the frusto-conical wall with the bracket base axially-disposed on a chord to the opening, an arcuate-shaped motor-enclosing element, and coacting interlocking means on the bracket and the element for removably positioning the element around the motor secured to the bracket base to form an air-flow channel around the motor.

3. A unit-heater motor-mounting comprising, a unit-heater housing-plate with an inwardly-extending axially-open frusto-conical wall section, a bracket having a rectangular base with integral divergently-extending substantially triangular-shaped wings along the lateral edges of the base which wings terminate in integral flanges along their outer edges bonded to the inner face of the frusto-conical wall with the bracket base axially disposed on a chord to the opening, channel-shaped means secured to the outer faces of the bracket wings and extending axially of the housing plate, an arcuate-shaped motor-enclosing element the ends of which are bent to form reverse parallel flanges telescoping with the channel-shaped means on the bracket for removably positioning the element around the motor secured to the bracket base to form an air-flow channel around the motor.

References Cited in the file of this patent

UNITED STATES PATENTS

| | | |
|---|---|---|
| 1,460,146 | Spielman | June 26, 1923 |
| 1,828,746 | Paasche | Oct. 27, 1931 |
| 2,370,309 | Hartwig | Feb. 27, 1945 |
| 2,504,798 | Brinen | Apr. 18, 1950 |
| 2,522,097 | Cookson | Sept. 12, 1950 |
| 2,670,935 | Arnold | Mar. 2, 1954 |